United States Patent
Iwasa et al.

(10) Patent No.: US 7,789,780 B2
(45) Date of Patent: Sep. 7, 2010

(54) CONTROL DEVICE AND CONTROL METHOD FOR CONTINUOUSLY VARIABLE TRANSMISSION

(75) Inventors: Hiroki Iwasa, Machida (JP); Yoshihisa Kodama, Sagamihara (JP)

(73) Assignee: JATCO Ltd, Fuji-shi (JP)

( * ) Notice: Subject to any disclaimer, the term of this patent is extended or adjusted under 35 U.S.C. 154(b) by 88 days.

(21) Appl. No.: 11/950,937

(22) Filed: Dec. 5, 2007

(65) Prior Publication Data

US 2008/0139350 A1 Jun. 12, 2008

(30) Foreign Application Priority Data

Dec. 6, 2006 (JP) ............... 2006-329229

(51) Int. Cl.
*F16H 61/00* (2006.01)
*F16H 61/664* (2006.01)
*F16H 63/00* (2006.01)

(52) U.S. Cl. ............... 474/18; 474/28; 474/44; 474/46; 701/51; 701/54; 701/60; 701/64; 477/46; 477/48

(58) Field of Classification Search ............... 474/18, 474/28
See application file for complete search history.

(56) References Cited

U.S. PATENT DOCUMENTS 6,672,981 B2 * 1/2004 Inoue et al. ................ 474/28
6,800,044 B2 * 10/2004 Inamura ..................... 474/18
7,192,371 B2 3/2007 Yamamoto et al.
2002/0173391 A1 * 11/2002 Endo et al. ................. 474/18
2004/0116244 A1 * 6/2004 Yamamoto et al. ........... 477/44
2004/0116245 A1 * 6/2004 Yamamoto et al. ........... 477/46
2004/0128046 A1 * 7/2004 Yamamoto et al. ........... 701/51
2004/0171444 A1 9/2004 Yamamoto et al.

FOREIGN PATENT DOCUMENTS

| EP | 1 400 728 A2 | 3/2004 |
| EP | 1 582 394 A2 | 10/2005 |
| JP | 63-74736 A | 4/1988 |
| JP | 2002-181180 A | 6/2002 |
| JP | 2004-108510 A | 4/2004 |
| JP | 2004-108548 A | 4/2004 |
| JP | 2004-125037 A | 4/2004 |
| JP | 2004-316861 A | 11/2004 |

* cited by examiner

*Primary Examiner*—Robert A Siconolfi
*Assistant Examiner*—San Aung
(74) *Attorney, Agent, or Firm*—Foley & Lardner LLP

(57) ABSTRACT

During Low return control, in which a speed ratio determined by a contact radius of a V-belt (4) with a non-rotating primary pulley (2) and a non-rotating secondary pulley (3) is shifted toward lowest speed ratio while the vehicle is stationary, an estimated speed ratio (ic) is calculated on the basis of a secondary pulley pressure (Psec). When a start request is issued to the vehicle while Low return control is underway, a primary pulley pressure (Ppri) and the secondary pulley pressure (Psec) are controlled on the basis of the estimated speed ratio (ic).

9 Claims, 4 Drawing Sheets

CONTROL DEVICE AND CONTROL METHOD FOR CONTINUOUSLY VARIABLE TRANSMISSION

FIELD OF THE INVENTION

This invention relates to a control device and a control method for a continuously variable transmission.

BACKGROUND OF THE INVENTION

In a vehicle installed with a continuously variable transmission, a belt is looped around a primary pulley and a secondary pulley, and a speed change is performed by varying a rotation radius of the belt relative to the primary pulley and the secondary pulley. As disclosed in JP63-074736A, when the vehicle brakes or decelerates, a speed ratio is returned to a lowest speed ratio in preparation for the next start following stopping, whereupon speed change control is performed to stop the vehicle. When the vehicle stops before the speed ratio returns to the lowest speed ratio during emergency braking or rapid deceleration, control is performed to return the speed ratio to the low side speed ratio after the next start so that the speed ratio is suitable for starting. During this type of control, however, the speed at which the speed ratio is shifted to the low side speed ratio is restricted to avoid belt slippage.

Further, when a primary pulley pressure does not rise to or above a predetermined pressure even after a predetermined period of time has elapsed following activation of the vehicle, control such as that disclosed in JP2004-125037A may be performed. In this control, it is determined that a deviation has occurred between stored pulley information and the actual speed ratio, and while gradually displacing a step motor to an operating position corresponding to a high speed ratio, a determination is made as to whether or not the primary pulley pressure has increased. Thus, the vehicle can be started by setting the step motor to an appropriate operating position.

SUMMARY OF THE INVENTION

In the inventions described above, however, when the speed ratio is shifted from a comparatively high side speed ratio to the low side speed ratio, a large load acts on the belt as the vehicle starts, and as a result, the belt may deteriorate.

This problem can be solved by draining the primary pulley pressure when the vehicle is stationary and the clutch is completely disengaged, for example, increasing the secondary pulley pressure, and displacing the looping position of the belt to a lowest speed ratio position while the pulleys are in a non-rotational state, but if a driver issues a start request during this control before the looping position of the belt has returned to a position corresponding to the lowest speed ratio, a primary pulley chamber must be filled with working oil before the clutch is engaged to ensure that belt slippage does not occur.

In a continuously variable transmission such as that described in JP2004-125037A, where working oil is supplied to and discharged from the primary pulley chamber in accordance with the positional relationship between the driving position of the step motor and a movable sheave of the primary pulley, the working oil in the primary pulley chamber is drained by displacing the driving position of the step motor to a position corresponding to an even lower side speed ratio than the position at the lowest speed ratio, and therefore, in order to switch to a state in which working oil is introduced into the primary pulley chamber, the driving position of the step motor must be displaced to a position corresponding to an even higher side speed ratio than a position corresponding to the current speed ratio.

However, when the pulleys are in a non-rotational state, the speed ratio cannot be calculated on the basis of the relationship between the rotation speed of the primary pulley and the rotation speed of the secondary pulley, and therefore the current speed ratio cannot be detected using these parameters.

If a sensor which detects the primary pulley pressure is provided at this time, as in the continuously variable transmission of JP2004-125037A, the primary pulley chamber can be filled with working oil by gradually displacing the driving position of the step motor to the position corresponding to the high side speed ratio until the primary pulley pressure reaches or exceeds a predetermined value, even when the current speed ratio is unknown.

However, in a continuously variable transmission not provided with a sensor that detects the primary pulley pressure, it is impossible to determine whether or not the primary pulley pressure is increasing, and the step motor cannot be displaced accurately to a position in which the primary pulley pressure can be supplied relative to the current speed ratio. As a result, the startability of the vehicle may be impeded.

The present invention has been designed in order to solve these problems, and it is an object thereof to enable accurate estimation of a current speed ratio when a vehicle is stationary and control is underway to shift the speed ratio toward a low side speed ratio while a primary pulley and a secondary pulley are in a non-rotational state, and also to prevent belt slippage and ensure the starting performance of the vehicle when a start request is issued to the vehicle during this control.

The present invention provides a continuously variable transmission which comprises an input side primary pulley which varies a groove width according to a first oil pressure, an output side secondary pulley which varies a groove width according to a second oil pressure, a belt looped around the primary pulley and the secondary pulley, having a contact radius with the pulleys which varies in accordance with the groove width, in which a rotary force transmitted from an output side of an engine of a vehicle via a frictional engagement element is transmitted from the primary pulley to the secondary pulley via the belt, and a speed ratio determined according to a relationship of the contact radius varies continuously, a speed change actuator, a speed change control valve which controls the first oil pressure by switching between a position for supplying the first oil pressure to the primary pulley, a position for discharging the first oil pressure, and a neutral position in accordance with a physical positional relationship between a position of a variable sheave of the primary pulley and a position of the speed change actuator, a pressure adjusting mechanism which adjusts the second oil pressure, a sensor which detects the second oil pressure, and a controller.

The controller shifts the speed ratio toward a lowest speed ratio by controlling the speed change control valve so that the first oil pressure reaches substantially zero and reducing the contact radius between the belt and the primary pulley and by controlling the pressure adjusting mechanism so that the second oil pressure rises to a predetermined oil pressure and increasing the contact radius between the belt and the secondary pulley while the primary pulley and the secondary pulley are in a non-rotational state, when the vehicle is stationary and the frictional engagement element is released, stores a speed ratio immediately prior to a stop as a pre-stop speed ratio, integrates a speed ratio variation determined on the basis of the detected second oil pressure during the shifting of the speed ratio toward the lowest speed ratio, and estimates the speed ratio which is shifting toward the lowest speed ratio on the basis of the pre-stop speed ratio and the integrated speed ratio variation.

According to this invention, when the vehicle is stationary, the current speed ratio can be estimated accurately during control to shift the speed ratio toward the low side speed ratio while the primary pulley and secondary pulley are in a non-rotational state, and when a drive request is issued to the vehicle during this control, the primary pulley pressure can be supplied on the basis of the estimated current speed ratio. As a result, belt slippage can be prevented and the starting performance of the vehicle can be ensured.

The details as well as other features and advantages of this invention are set forth in the remainder of the specification and are shown in the accompanying drawings.

DETAILED DESCRIPTION OF THE PREFERRED EMBODIMENT

Figure 1:
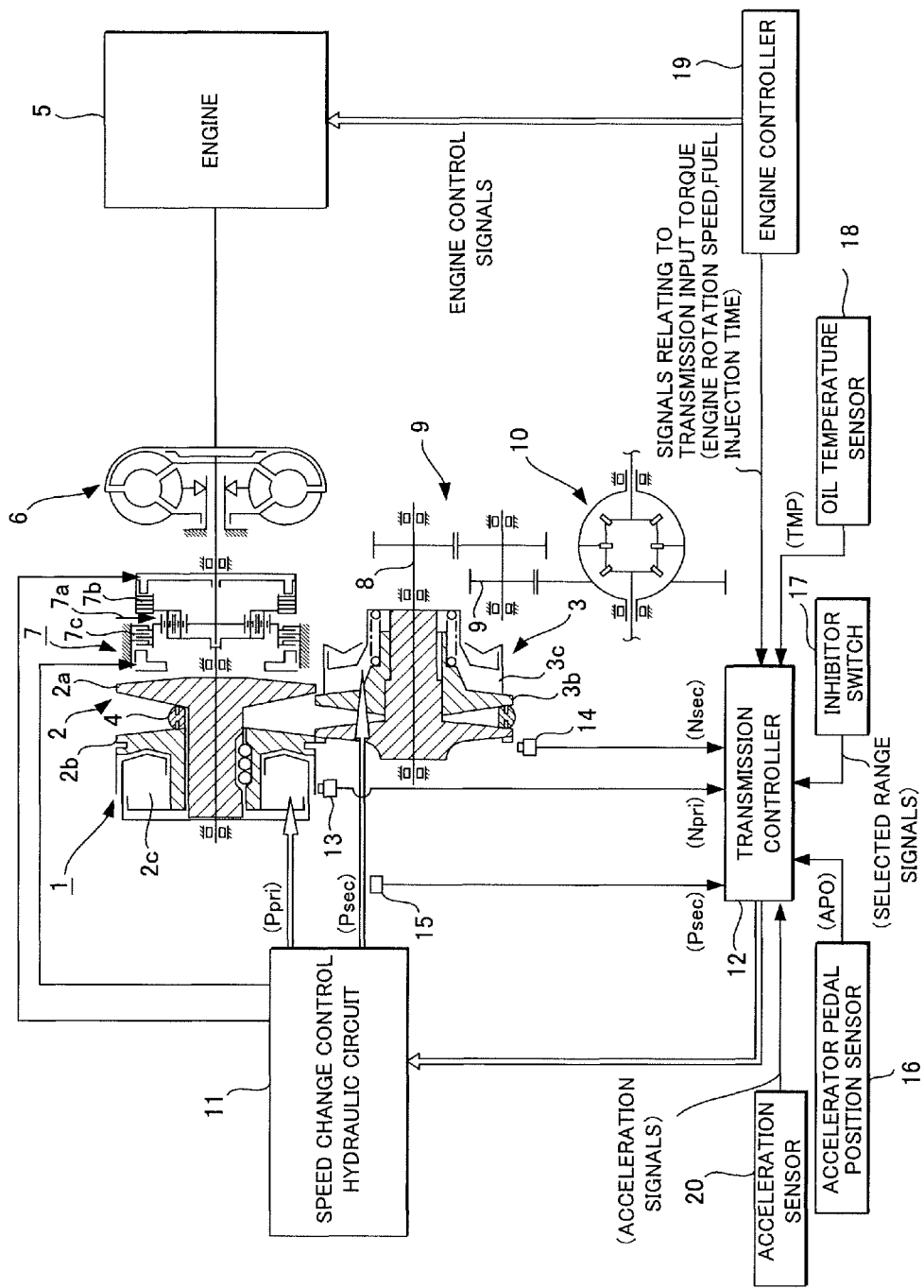
FIG. 1 is a schematic constitutional diagram of a continuously variable transmission according to an embodiment of this invention.

An embodiment of this invention will be described in detail below on the basis of the drawings. FIG. 1 shows an outline of a V-belt continuously variable transmission 1. The V-belt continuously variable transmission 1 comprises a primary pulley 2 and a secondary pulley 3 arranged such that the V-grooves of the two are aligned, and a V-belt 4 which is looped around the V-grooves of the pulleys 2, 3. An engine 5 is disposed coaxial with the primary pulley 2, and a torque converter 6 comprising a lockup clutch and a forward-reverse switching mechanism 7 are provided between the engine 5 and primary pulley 2 in succession from the engine 5 side.

The forward-reverse switching mechanism 7 comprises a double pinion planetary gear set 7a as a principal constitutional element, the sun gear thereof being joined to the engine 5 via the torque converter 6 and the carrier thereof being joined to the primary pulley 2. The forward-reverse switching mechanism 7 further comprises a forward clutch 7b which is directly coupled between the sun gear and carrier of the double pinion planetary gear set 7a, and a reverse brake 7c which fixes a ring gear. When the forward clutch 7b is engaged, an input rotation input from the engine 5 via the torque converter 6 is transmitted to the primary pulley 2 as is, and when the reverse brake 7c is engaged, the input rotation input from the engine 5 via the torque converter 6 is reversed and transmitted to the secondary pulley 2.

The rotation of the primary pulley 2 is transmitted to the secondary pulley 3 via the V-belt 4, and the rotation of the secondary pulley 3 is transmitted thereafter to a vehicle wheel, not shown in the drawing, via an output shaft 8, a gear set 9, and a differential gear device 10.

To make a rotation transmission ratio (speed ratio) between the primary pulley 2 and secondary pulley 3 variable during this power transmission, the sheaves forming the respective V-grooves of the primary pulley 2 and secondary pulley 3 are divided into fixed sheaves 2a, 3a, and movable sheaves 2b, 3b which are capable of axial displacement. The movable sheaves 2b, 3b are biased toward the fixed sheaves 2a, 3a through the supply of a primary pulley pressure (first oil pressure) (Ppri) and a secondary pulley pressure (second oil pressure) (Psec), which are generated using a line pressure as a source pressure, to a primary pulley chamber 2c and a secondary pulley chamber 3c. As a result, the V-belt 4 is caused to frictionally engage with the sheaves such that power transmission between the primary pulley 2 and secondary pulley 3 is performed.

During a speed change, the V-groove width of the two pulleys 2, 3 is varied by the differential pressure between the primary pulley pressure (Ppri) and secondary pulley pressure (Psec), which are generated in accordance with a target speed ratio (I(o)), and by continuously varying the looped arc diameter of the V-belt 4 relative to the pulleys 2, 3, an actual speed ratio (to be referred to here after speed ratio) (ip) is varied, and the target speed ratio (I(o)) is realized.

The primary pulley pressure (Ppri) and secondary pulley pressure (Psec) are controlled by a speed change control hydraulic circuit 11 together with the output of an engagement oil pressure of the forward clutch 7b, which is engaged when a forward traveling range is selected, and an engagement oil pressure of the reverse brake 7c, which is engaged when a reverse traveling range is selected. The speed change control hydraulic circuit 11 performs control in response to a signal from a transmission controller 12.

Signals from a primary pulley rotation sensor 13 which detects a primary pulley rotation speed (Npri), signals from a secondary pulley rotation sensor 14 which detects a secondary pulley rotation speed (Nsec), signals from a secondary pulley pressure sensor 15 which detects the secondary pulley pressure (Psec), signals from an accelerator opening sensor 16 which detects an accelerator pedal depression amount (APO), selected range signals from an inhibitor switch 17, signals from an oil temperature sensor 18 which detects a speed change hydraulic fluid temperature (TMP), signals (engine rotation speed and fuel injection time) relating to a transmission input torque (Ti) from an engine controller 19 which controls the engine 5, and signals from an acceleration sensor 20, are input into the transmission controller 12.

Figure 2:
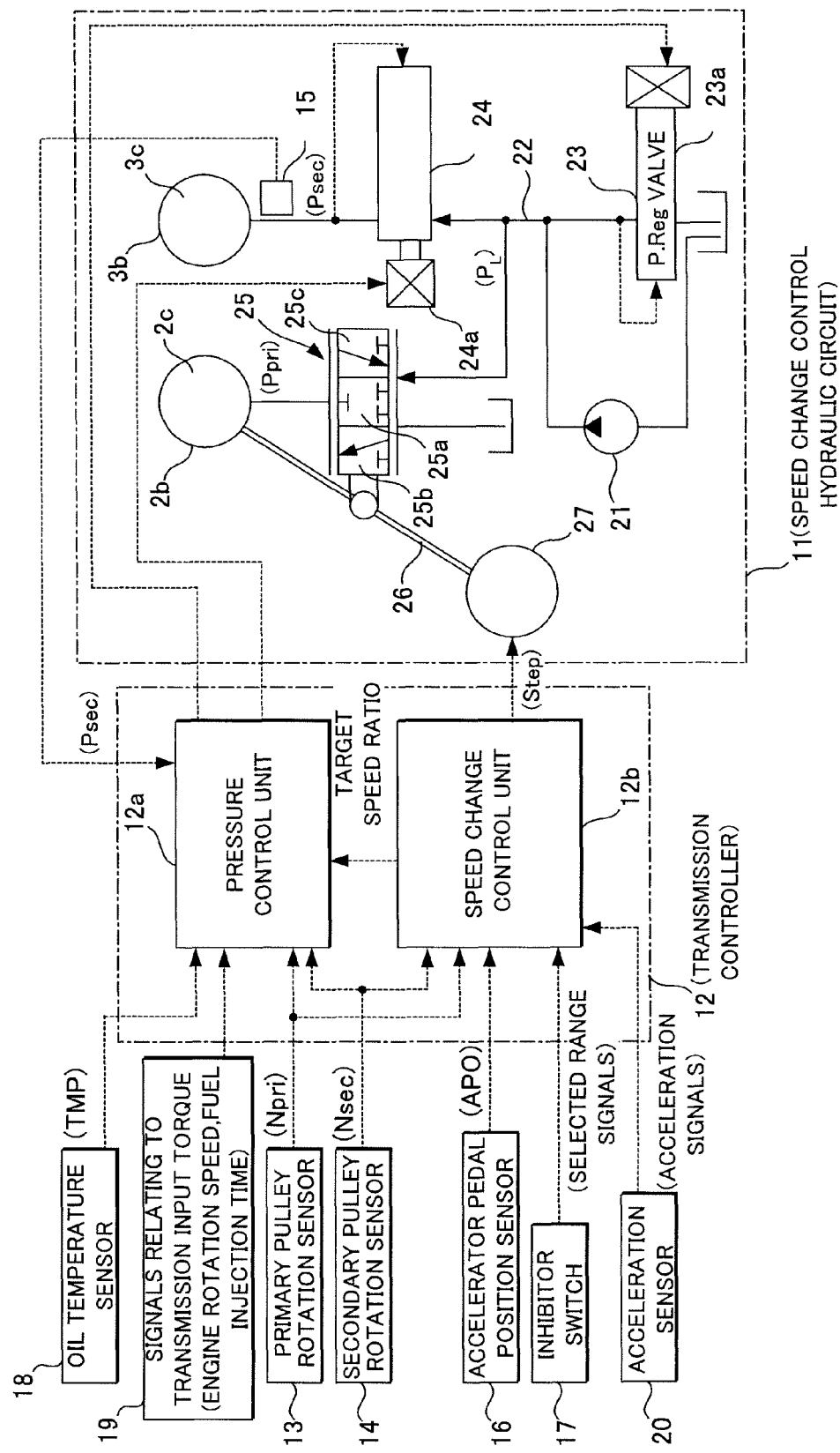
FIG. 2 is a schematic constitutional diagram of a speed change control hydraulic circuit and a transmission controller according to an embodiment of this invention.

Next, the speed change control hydraulic circuit 11 and transmission controller 12 will be described using the schematic diagram in FIG. 2. First, the speed change control hydraulic circuit 11 will be described.

The speed change control hydraulic circuit 11 comprises an engine-driven oil pump 21, and the pressure of a hydraulic fluid supplied to an oil passage 22 by the oil pump 21 is regulated to a predetermined line pressure (PL) by a pressure regulator valve 23. The pressure regulator valve 23 controls the line pressure (PL) in accordance with a drive duty input into a solenoid 23a.

The line pressure (PL) in the oil passage 22 is adjusted by a pressure reducing valve 24 and supplied to the secondary pulley chamber 3c as the secondary pulley pressure (Psec) on the one hand, and adjusted by a speed change control valve 25 and supplied to the primary pulley chamber 2c as the primary pulley pressure (Ppri) on the other hand. The pressure reducing valve 24 controls the secondary pulley pressure (Psec) in accordance with a drive duty input into a solenoid 24a.

The speed change control valve 25 comprises a neutral position 25a, a pressure increasing position 25b, and a pressure reducing position 25c, and to switch between these valve positions, the speed change control valve 25 is connected to the middle of a speed change link 26. The speed change link 26 is connected to a step motor 27 serving as a speed change actuator at one end thereof, and to the movable sheave 2b of the primary pulley 2 at the other end thereof.

The step motor 27 is set in an operating position which is advanced from a home position by a step count (Step) corresponding to the target speed ratio (I(o)), and through the operation of the step motor 27, the speed change link 26 swings using a connecting portion with the movable sheave 2b as a fulcrum. As a result, the speed change control valve 25 is moved from the neutral position 25a to the pressure increasing position 25b or the pressure reducing position 25c. Hence, the primary pulley pressure (Ppri) is increased using the line pressure (PL) as a source pressure or decreased through a drain, and thus the differential pressure between the primary pulley pressure (Ppri) and secondary pulley pressure (Psec) is varied so as to generate an upshift to a high side speed ratio or a downshift to a low side speed ratio. Accordingly, the speed ratio (ip) follows the target speed ratio (I(o)).

The speed change advancement is fed back to the corresponding end of the speed change link 26 via the movable sheave 2b of the primary pulley 2, and the speed change link 26 swings about a connecting portion with the step motor 27 in a direction which returns the speed change control valve 25 from the pressure increasing position 25b or the pressure reducing position 25c to the neutral position 25a. Hence, when the target speed ratio (I(o)) is reached, the speed change control valve 25 is returned to the neutral position 25a so that the target speed ratio (I(o)) can be maintained.

The solenoid drive duty of the pressure regulator valve 23, the solenoid drive duty of the pressure reducing valve 24, and a speed change command (step count) input into the step motor 27 are issued by the transmission controller 12. The transmission controller 12 also performs control to determine whether or not to supply the engagement oil pressure to the forward clutch 7b and reverse brake 7c shown in FIG. 1. The transmission controller 12 is constituted by a pressure control unit 12a and a speed change control unit 12b.

The pressure control unit 12a determines a solenoid drive duty of the pressure regulator valve 23 and a solenoid drive duty of the pressure reducing valve 24, and a speed change control unit 12b calculates an attained speed ratio (DsrRTO) and the target speed ratio (I(o)).

When the vehicle stops, the attained speed ratio (DsrRTO) is calculated as the vehicle speed decreases, and the target speed ratio (I(o)) is determined on the basis of the attained speed ratio (DsrRTO).

When the vehicle stops, the attained speed ratio (DsrRTO) is set on the low side speed ratio as the vehicle speed decreases, the target speed ratio (I(o)) is also set on the low side speed ratio in accordance therewith, and the step motor 27 is displaced to a position corresponding to the target speed ratio (I(o)), or more specifically a position in which the speed ratio control valve 25 reaches the pressure reducing position 25c. Thus, the vehicle is stopped by performing a downshift such that the speed ratio (ip) finally reaches a lowest speed ratio. The lowest speed ratio is the largest gear ratio in the ratios which are used during traveling.

During traveling, the speed ratio (ip) is determined by dividing the primary pulley rotation speed (Npri) detected by the primary pulley rotation sensor 13 by the secondary pulley rotation speed (Nsec) detected by the secondary pulley rotation sensor 14 in a fixed calculation cycle (of 10 ms, for example). When the vehicle speed is less than a predetermined value (a first predetermined value of 3 km/hr, for example) or the primary pulley rotation speed (Npri) is less than a predetermined value (a second predetermined value of 200 rpm, for example), it is determined that the vehicle is about to stop, and the speed ratio (ip) determined in the immediately preceding calculation cycle (prior to the predetermined cycle) is stored as a pre-stop speed ratio (ips). It should be noted that a value calculated a plurality of cycles before the vehicle stops may be stored as the pre-stop speed ratio (ips) instead of the value of the speed ratio (ip) calculated in the immediately preceding cycle.

The vehicle may stop before the speed ratio (ip) reaches the lowest speed ratio, and in this case, Low return control is performed while the vehicle is stationary and the clutch is completely disengaged by completely draining the primary pulley pressure (Ppri) and increasing the secondary pulley pressure (Psec) to a predetermined pressure. Hence, even when the primary pulley 2 and secondary pulley 3 do not rotate, the movable sheaves 2b, 3b move such that in the primary pulley 2, the looped arc diameter of the V-belt 4 decreases, and in the secondary pulley 3, the looped arc diameter of the V-belt 4 increases. By varying the relative positions of the primary pulley 2 and secondary pulley 3 in this manner, the speed ratio, which is determined according to the relationship between the looped arc diameters of the primary pulley 2 and secondary pulley 3, shifts to the low side speed ratio.

By performing Low return control in the manner described above to set the speed ratio (ip) of the continuously variable transmission 1 at the lowest speed ratio when the vehicle stops before the speed ratio (ip) reaches the lowest speed ratio, the vehicle can be started upon the next start from a state in which the speed ratio (ip) is at the lowest speed ratio.

Figure 3:
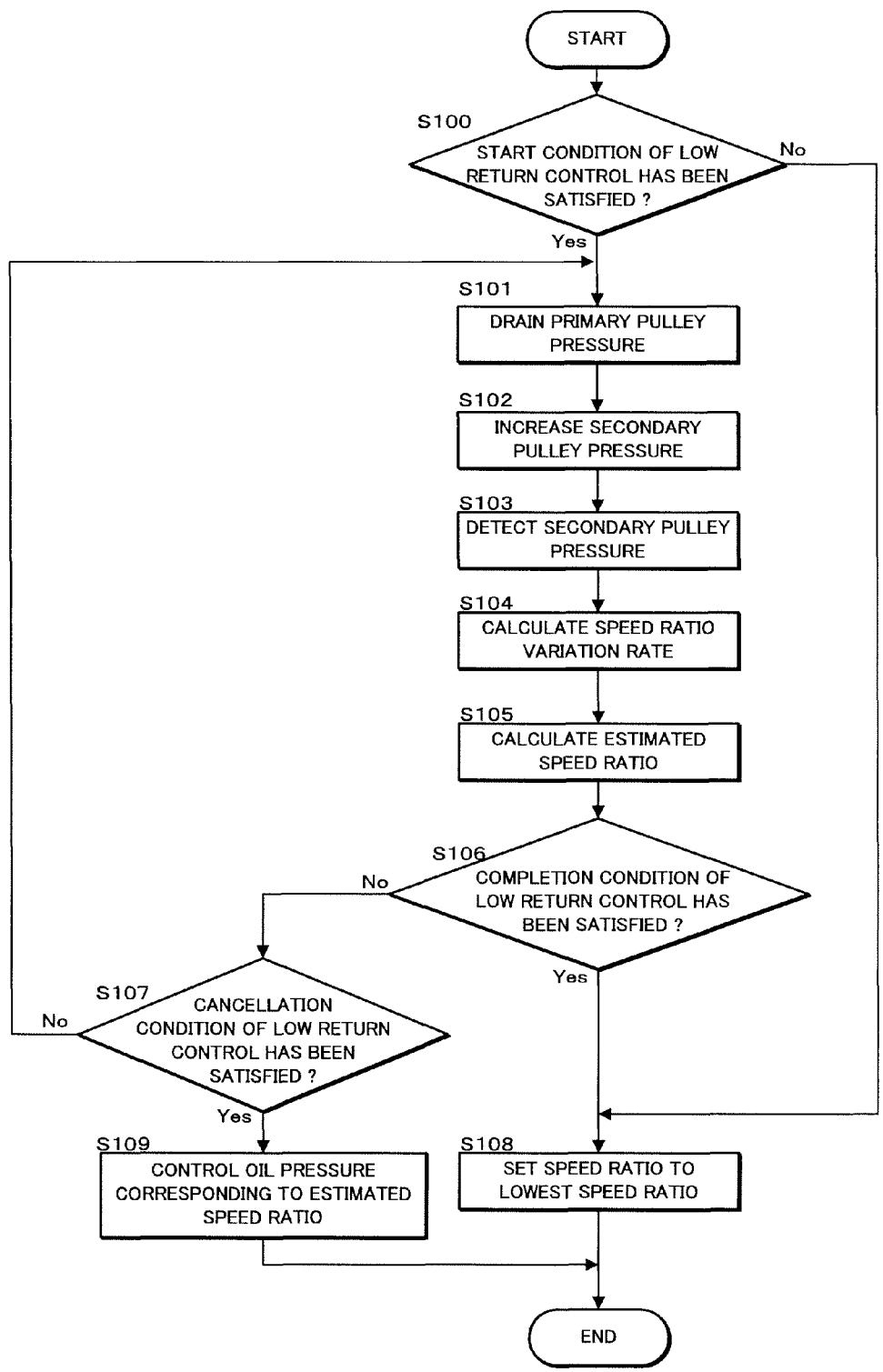
FIG. 3 is a flowchart illustrating Low return control according to an embodiment of this invention.

When a start request is issued to the vehicle while Low return control is underway and the current speed ratio can be estimated by detecting the primary pulley pressure (Ppri), as in JP2004-125037A, the step motor 27 can be displaced to a necessary position for supplying the primary pulley 2 with an appropriate oil pressure to start the vehicle. In a continuously variable transmission not provided with a primary pulley pressure sensor, however, the speed ratio cannot be estimated, and therefore the step motor 27 cannot be displaced to an appropriate position. When the step motor 27 cannot be displaced to an appropriate position, the forward-reverse switching mechanism 7 may transmit power from the engine 5 even though the primary pulley pressure (Ppri) has been drained during Low return control, and as a result, the V-belt 4 may slip. A Low return control procedure for solving this problem will be described in detail below using the flowchart in FIG. 3. The following control is performed at predetermined time intervals.

In a step S100, a determination is made as to whether or not a start condition of the Low return control has been satisfied. When the start condition of the Low return control is satisfied, the stored pre-stop speed ratio (ips) is read, and the routine advances to a step S101. When the start condition of the Low return control is not satisfied, the control is terminated.

The start condition of the Low return control is satisfied when the vehicle is completely stationary, the shift range is in an N range, and the speed ratio (ip) is on the high side speed ratio of a predetermined value (2.0, for example), or in other words when the vehicle stops before the speed ratio (ip) has shifted to a sufficiently low side speed ratio to enable the vehicle to start, and no power is transmitted from the engine 5. The vehicle may be determined to be completely stationary on the basis of information such as the brake being operative, the accelerator pedal being inoperative, and the vehicle speed being less than a predetermined vehicle speed (1 km/h, for example). Further, complete disengagement of the forward clutch 7b (reverse brake 7c) may be used as a condition for determining that no power is being transmitted from the engine 5. The vehicle speed is calculated on the basis of the secondary pulley rotation speed (Nsec).

In a step S101, the operating position of the step motor 27 is set in a position on a mechanically even lower side speed ratio than the position at the lowest speed ratio, and drainage of the primary pulley pressure (Ppri) is begun. In this embodiment, the primary pulley pressure (Ppri) is drained to substantially zero.

In a step S102, oil is supplied to the secondary pulley chamber 3c to increase the secondary pulley pressure (Psec). In this embodiment, the secondary pulley pressure (Psec) is raised to a preset predetermined pressure (P1). The predetermined pressure (P1) is a pressure serving as the strength limit of the V-belt 4. When drainage of the primary pulley pressure (Ppri) is begun in the step S101 and the secondary pulley pressure (Psec) is increased in the step S102, the speed ratio (ip) is shifted gradually toward the lowest speed ratio while the pulleys 2, 3 remain in a non-rotational state.

In a step S103, the secondary pulley pressure (Psec) is detected by the secondary pulley pressure sensor 15.

Figure 4:
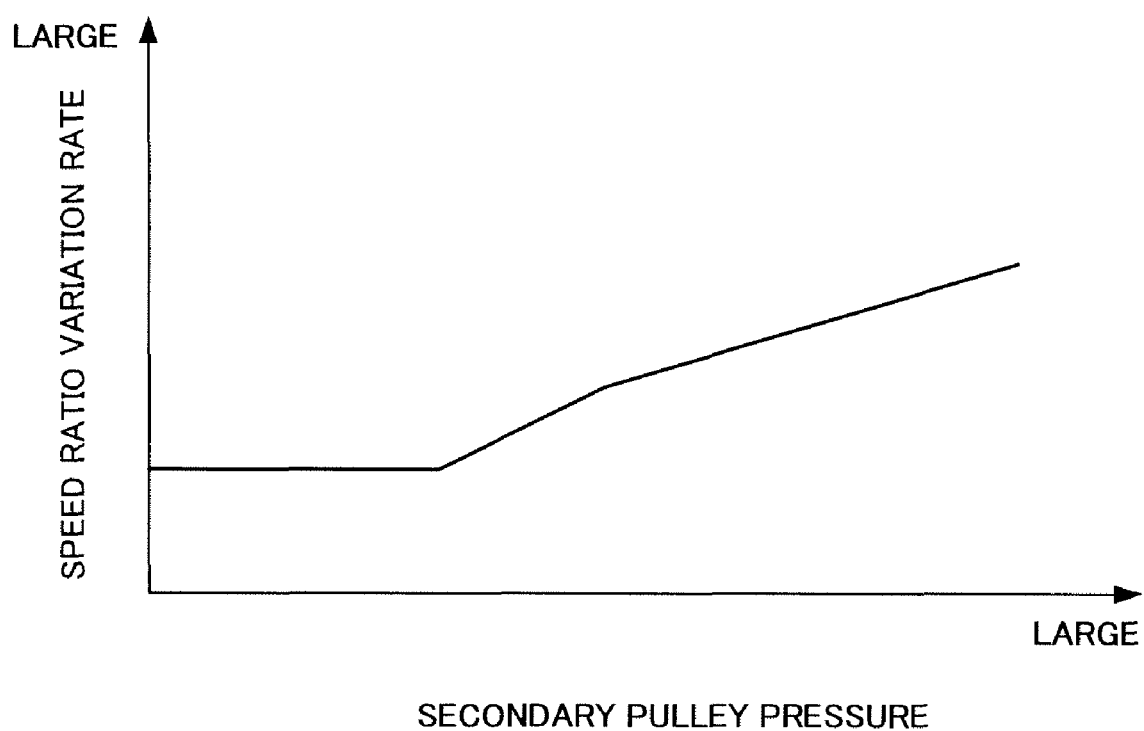
FIG. 4 is a map showing a relationship between a primary pulley pressure and a speed ratio variation rate, according to this invention.

In a step S104, a speed ratio variation rate (dip) is calculated from the secondary pulley pressure (Psec) detected in the step S103 using FIG. 4. FIG. 4 is a map showing a relationship between the secondary pulley pressure (Psec) and the speed ratio variation rate (speed ratio variation) (dip) when the primary pulley pressure (Ppri) is drained and the secondary pulley pressure (Psec) is increased. According to FIG. 4, when the secondary pulley pressure (Psec) rises, the speed ratio variation rate (dip) increases.

In a step S105, the speed ratio variation rate (dip) calculated in the step S104 is added to a previously calculated estimated speed ratio (ic) to calculate a current estimated speed ratio (ic). When this control is preformed for the first time and the previously calculated estimated speed ratio (ic) does not exist, the estimated speed ratio (ic) is calculated by adding the speed ratio variation rate (dip) calculated in the step S104 to the speed ratio (ip) immediately before the beginning of Low return control, or in other words the stored pre-stop speed ratio (ips).

In a step S106, a determination is made as to whether or not a completion condition of the Low return control has been satisfied. When the completion condition of the Low return control is not satisfied, the routine advances to a step S107, and when the completion condition of the Low return control is satisfied, the routine advances to a step S108.

The completion condition of the low return control is satisfied when the primary pulley pressure (Ppri) has been completely drained and the secondary pulley pressure (Psec) has been at the predetermined pressure (P1) continuously for a predetermined time period or the estimated speed ratio (ic) is at the lowest speed ratio.

In a step S107, a determination is made as to whether or not a cancellation condition of the Low return control is satisfied. When the cancellation condition of the Low return control has been satisfied, the routine advances to a step S109, and when the cancellation condition of the Low return control is not satisfied, the routine returns to the step S101, whereupon the control described above is repeated.

The cancellation condition of the Low return control is satisfied when the shift lever has been operated to the D range or the R range and the accelerator pedal has been depressed, when the vehicle speed has increased beyond a predetermined vehicle speed, and any other case in which a start request is issued to the vehicle.

When the completion condition of the Low return control is satisfied in the step S106, the relative positions of the primary pulley 2 and the secondary pulley 3 correspond to a case in which the speed ratio (ip) is at the lowest speed ratio or on a mechanically even lower side than the lowest speed ratio. In the step S108, the operating position of the step motor 27 is set in a position in which the speed ratio (ip) reaches the lowest speed ratio, and the secondary pulley pressure (Psec) is set at a pressure at which the speed ratio (ip) reaches the lowest speed ratio. Thus, during the next start, the vehicle can be started from a state in which the speed ratio (ip) is at Lowest, enabling an improvement in the starting performance of the vehicle.

In the step S109, since the cancellation condition of the Low return control has been satisfied, or in other words a start request has been issued during Low return control, in the step S107, the operating position of the step motor 27 is set in a position (predetermined position) on the high side speed ratio of a position corresponding to the estimated speed ratio (ic), calculated in the step S105, by a predetermined amount. Further, the secondary pulley pressure (Psec) is set at a pressure at which the estimated speed ratio (ic) is realized.

Thus, the speed change control valve 25 can be set at the pressure increasing position 25a such that the primary pulley pressure (Ppri) can be supplied reliably, and even if power is transmitted from the engine 5, the startability of the vehicle can be ensured without slippage in the V-belt 4.

By means of the control described above, the estimated speed ratio (ic) is calculated on the basis of the secondary pulley pressure (Psec) during Low return control such that even if a start request is issued to the vehicle during Low return control, the primary pulley pressure (Ppri) can be controlled on the basis of the estimated speed ratio (ic). Hence, even if a start request is issued to the vehicle during Low return control, the primary pulley pressure (Ppri) and secondary pulley pressure (Psec) can be controlled appropriately in accordance with the estimated speed ratio (ic), and the vehicle can be started quickly.

It should be noted that this control may be used on a vehicle employing a starting clutch without the torque converter 2. When a starting clutch is employed, Low return control can be performed quickly, which is desirable.

Furthermore, calculation of the estimated speed ratio (ic) may be begun after the primary pulley pressure (Ppri) has completely reached zero. In so doing, the estimated speed ratio (ic) is estimated to be on the high side speed ratio of the actual pulley ratio, and therefore, when Low return control is cancelled such that the operating position of the step motor 27 is set on the basis of the estimated speed ratio (ic), the primary pulley pressure (Ppri) can be supplied reliably and slippage of the V-belt 4 can be suppressed.

The effects of this embodiment of the invention will now be described.

In this embodiment, when the primary pulley pressure (Ppri) and secondary pulley pressure (Psec) are controlled without rotating the primary pulley 2 and secondary pulley 3 while the vehicle is stationary such that the speed ratio, which is determined according to the relationship between the looped arc diameters of the primary pulley 2 and secondary pulley 3, shifts to the low side speed ratio, the estimated speed ratio (ic) is calculated on the basis of the secondary pulley pressure (Psec). Thus, the speed ratio during Low return control can be estimated without using a primary pulley pressure sensor, and when a start request is issued to the vehicle during Low return control, the primary pulley pressure (Ppri) can be supplied on the basis of the estimated speed ratio (ic). Hence, when a start request is issued to the vehicle during Low return control, the startability of the vehicle can be ensured without slippage in the V-belt 4.

By completely draining the primary pulley pressure (Ppri) and increasing the secondary pulley pressure (Psec) to the predetermined pressure (P1) when the pulley ratio between the primary pulley 2 and secondary pulley 3 shifts to the low side speed ratio, the speed ratio can be changed quickly while the vehicle is stationary.

By displacing the operating position of the step motor 27 to the position corresponding to the high side speed ratio of the estimated speed ratio (ic) when a start request is issued to the vehicle during Low return control, the primary pulley pressure (Ppri) can be supplied reliably, and the startability of the vehicle can be ensured without slippage in the V-belt 4.

What is claimed is:

1. A continuously variable transmission comprising:
    an input side primary pulley which varies a groove width according to a first oil pressure;
    an output side secondary pulley which varies a groove width according to a second oil pressure;
    a belt looped around the primary pulley and the secondary pulley, having a contact radius with the pulleys which varies in accordance with the groove width, in which a rotary force transmitted from an output side of an engine of a vehicle via a frictional engagement element is transmitted from the primary pulley to the secondary pulley via the belt, and a speed ratio determined according to a relationship of the contact radius varies continuously;
    a speed change actuator;
    a speed change control valve which controls the first oil pressure by switching between a position for supplying the first oil pressure to the primary pulley, a position for discharging the first oil pressure, and a neutral position in accordance with a physical positional relationship between a position of a variable sheave of the primary pulley and a position of the speed change actuator;
    a pressure adjusting mechanism which adjusts the second oil pressure;
    a sensor which detects the second oil pressure; and
    a controller, which:
        when the vehicle is in a low return control state such that the vehicle is stationary and the frictional engagement element is released, shifts the speed ratio toward a lowest speed ratio by controlling the speed change control valve so that the first oil pressure reaches substantially zero and reducing the contact radius between the belt and the primary pulley and by controlling the pressure adjusting mechanism so that the second oil pressure rises to a predetermined oil pressure and increasing the contact radius between the belt and the secondary pulley while the primary pulley and the secondary pulley are in a non-rotational state;
        stores a speed ratio immediately prior to when the vehicle stops as a pre-stop speed ratio;
        integrates a speed ratio variation determined on the basis of the detected second oil pressure during the shifting of the speed ratio toward the lowest speed ratio, when the first oil pressure is decreased and the second oil pressure is increased; and
        estimates, at a first time interval, the speed ratio which is shifting toward the lowest speed ratio on the basis of adding the pre-stop speed ratio to the integrated speed ratio variation and estimates, at time intervals subsequent to the first time interval, the speed ratio on the basis of adding a previously estimated speed ratio to the integrated speed ratio variation.

2. The continuously variable transmission as defined in claim 1, wherein the controller displaces a feed position of the speed change actuator to a predetermined position on a high side speed ratio of a position corresponding to the speed ratio estimated, when the speed change is cancelled during the shifting of the speed ratio toward the lowest speed ratio.

3. The continuously variable transmission as defined in claim 1, further comprising:
    a first sensor which detects a vehicle speed;
    a second sensor which detects a rotation speed of the primary pulley; and
    a third sensor which detects a rotation speed of the secondary pulley; wherein
    the controller calculates the speed ratio from a relationship between the rotation speed of the primary pulley and the rotation speed of the secondary pulley at intervals of a predetermined cycle, and when at least one of the vehicle speed falling below a first predetermined value and the rotation speed of the primary pulley falling below a second predetermined value is established, stores the speed ratio prior to the predetermined cycle as the pre-stop speed ratio.

4. A control method for a continuously variable transmission, the transmission comprising:
    an input side primary pulley which varies a groove width according to a first oil pressure;
    an output side secondary pulley which varies a groove width according to a second oil pressure;
    a belt looped around the primary pulley and the secondary pulley, having a contact radius with the pulleys which varies in accordance with the groove width, in which a rotary force transmitted from an output side of an engine of a vehicle via a frictional engagement element is transmitted from the primary pulley to the secondary pulley via the belt, and a speed ratio determined according to a relationship of the contact radius varies continuously;
    a speed change actuator;
    a speed change control valve which controls the first oil pressure by switching between a position for supplying the first oil pressure to the primary pulley, a position for discharging the first oil pressure, and a neutral position in accordance with a physical positional relationship between a position of a variable sheave of the primary pulley and a position of the speed change actuator; and
    a pressure adjusting mechanism which adjusts the second oil pressure;
    the control method comprising:
        when the vehicle is in a low return control state such that the vehicle is stationary and the frictional engagement element is released, shifting the speed ratio toward a lowest speed ratio by controlling the speed change control valve so that the first oil pressure reaches substantially zero and reducing the contact radius between the belt and the primary pulley and by controlling the pressure adjusting mechanism so that the second oil pressure rises to a predetermined oil pressure and increasing the contact radius between the belt and the secondary pulley while the primary pulley and the secondary pulley are in a non-rotational state;
        storing a speed ratio immediately prior to when the vehicle stops as a pre-stop speed ratio;
        integrating a speed ratio variation determined on the basis of a detected second oil pressure during the shifting of the speed ratio toward the lowest speed ratio, when the first oil pressure is decreased and the second oil pressure is increased; and
        estimating, at a first time interval, the speed ratio which is shifting toward the lowest speed ratio on the basis of adding the pre-stop speed ratio to the integrated speed ratio variation, at time intervals subsequent to the first time interval, the speed ratio on the basis of adding a previously estimated speed ratio to the integrated speed ratio variation.

5. The control method for a continuously variable transmission as defined in claim 4, the control method further comprising:

displacing a feed position of the speed change actuator to a predetermined position on a high side speed ratio of a position corresponding to the speed ratio estimated, when the speed change is cancelled during the shifting of the speed ratio toward the lowest speed ratio.

6. The control method for a continuously variable transmission as defined in claim 4, the control method further comprising:

calculating the speed ratio from a relationship between a rotation speed of the primary pulley and a rotation speed of the secondary pulley at intervals of a predetermined cycle, and when at least one of a vehicle speed falling below a first predetermined value and the rotation speed of the primary pulley falling below a second predetermined value is established, storing the speed ratio prior to the predetermined cycle as the pre-stop speed ratio.

7. A continuously variable transmission, comprising:

an input side primary pulley which varies a groove width according to a first oil pressure;

an output side secondary pulley which varies a groove width according to a second oil pressure;

a belt looped around the primary pulley and the secondary pulley, having a contact radius with the pulleys which varies in accordance with the groove width, in which a rotary force transmitted from an output side of an engine of a vehicle via a frictional engagement element is transmitted from the primary pulley to the secondary pulley via the belt, and a speed ratio determined according to a relationship of the contact radius varies continuously;

a speed change actuator;

a speed change control valve which controls the first oil pressure by switching between a position for supplying the first oil pressure to the primary pulley, a position for discharging the first oil pressure, and a neutral position in accordance with a physical positional relationship between a position of a variable sheave of the primary pulley and a position of the speed change actuator;

means for adjusting the second oil pressure;

means for detecting the second oil pressure;

means for shifting the speed ratio toward a lowest speed ratio when the vehicle is in a low return control state such that the vehicle is stationary and the frictional engagement element is released by controlling the speed change control valve so that the first oil pressure reaches substantially zero and reducing the contact radius between the belt and the primary pulley and by controlling the means for adjusting so that the second oil pressure rises to a predetermined oil pressure and increasing the contact radius between the belt and the secondary pulley while the primary pulley and the secondary pulley are in a non-rotational state;

means for storing a speed ratio immediately prior to when the vehicle stops as a pre-stop speed ratio;

means for integrating a speed ratio variation determined on the basis of the detected second oil pressure during the shifting of the speed ratio toward the lowest speed ratio, when the first oil pressure is decreased and the second oil pressure is increased; and means for estimating, at a first time interval, the speed ratio which is shifting toward the lowest speed ratio on the basis of adding the pre-stop speed ratio to the integrated speed ratio variation, at time intervals subsequent to the first time interval, the speed ratio on the basis of adding a previously estimated speed ratio to the integrated speed ratio variation.

8. The continuously variable transmission as defined in claim 7, further comprising:

means for displacing a feed position of the speed change actuator to a predetermined position on a high side speed ratio of a position corresponding to the speed ratio estimated, when the speed change is cancelled during the shifting of the speed ratio toward the lowest speed ratio.

9. The continuously variable transmission as defined in claim 7, further comprising:

means for detecting a vehicle speed;

means for detecting a rotation speed of the primary pulley; and means for detecting a rotation speed of the secondary pulley; wherein the means for storing the speed ratio immediately prior to the stop calculates the speed ratio from a relationship between the rotation speed of the primary pulley and the rotation speed of the secondary pulley at intervals of a predetermined cycle, and when at least one of the vehicle speed falling below a first predetermined value and the rotation speed of the primary pulley falling below a second predetermined value is established, stores the speed ratio prior to the predetermined cycle as the pre-stop speed ratio.

* * * * *